(12) United States Patent
Kuo et al.

(10) Patent No.: US 7,532,039 B2
(45) Date of Patent: May 12, 2009

(54) CLOCK SIGNAL DETECTOR

(75) Inventors: Hung Yi Kuo, Taipei (TW); Janqlih Hsieh, Taipei (TW); Jenny Chen, Taipei (TW); Hueilin Chou, Taipei (TW)

(73) Assignee: Via Technologies, Inc., Taipei (TW)

( * ) Notice: Subject to any disclaimer, the term of this patent is extended or adjusted under 35 U.S.C. 154(b) by 70 days.

(21) Appl. No.: 11/648,593

(22) Filed: Jan. 3, 2007

(65) Prior Publication Data

US 2007/0152716 A1      Jul. 5, 2007

(30) Foreign Application Priority Data

Jan. 4, 2006    (TW) .............................. 95100351 A

(51) Int. Cl.
*H03D 13/00* (2006.01)
(52) U.S. Cl. ............................................. 327/12; 327/3
(58) Field of Classification Search ................. 327/1–3, 327/5, 12
See application file for complete search history.

(56) References Cited

U.S. PATENT DOCUMENTS

| | | | |
|---|---|---|---|
| 5,383,899 A * | 1/1995 | Hammerslag | 606/214 |
| 6,316,966 B1 * | 11/2001 | Chang et al. | 327/2 |
| 7,199,626 B2 * | 4/2007 | Yu et al. | 327/156 |
| 7,304,510 B2 * | 12/2007 | Matsuta | 327/3 |
| 2007/0273569 A1 * | 11/2007 | Lin | 341/155 |

FOREIGN PATENT DOCUMENTS

JP         2005059448 A  *   4/2005

* cited by examiner

*Primary Examiner*—Dinh T. Le
(74) *Attorney, Agent, or Firm*—Rosenberg, Klein & Lee

(57) ABSTRACT

A clock signal detector is provided. The device comprises a plurality of signal delayers and a plurality of flip-flops for comparing the offset range of the clock signal between two different groups, and transmitting the resulted signal to a phase compensator, which is used to send a regulating clock signal to a clock generator. Therefore, the offset ranges of the clock signals from two different groups will be within the range of the system requirement, such that it can optimize the system operation.

18 Claims, 4 Drawing Sheets

CLOCK SIGNAL DETECTOR

FIELD OF THE INVENTION

The present invention relates to a clock signal detector, and more particularly to a detector for detecting the offset of the clock signal.

BACKGROUND OF THE INVENTION

The modern life is flooded with all kinds of digital information since the electrical industry has rapidly developed. Data transmission, which is applied at a mobile communication, personal computer, digital appliances, and network communication, is handled by digital process, and the clock signal is generated to trigger for that, for example, the clock signal can be generated to coordinated the data signal between each chip and the system within the personal computer in order to deal with digital data transmission and application.

Recently, there are many different clock signals within a system as a result of each element having different advance and operation frequency; for example, the main clock frequency of the motherboard is 133 MHz, and that of the Central Process Unit (CPU) is 1.3 GHz, etc. Therefore, the clock synchronization and regulation between different operation frequencies of the elements will be very important within the system in order to transmit the data correctly therewith.

However, when a clock signal between each of chips or elements is regulated according to the reference clock signal, it is easy to offset the reference clock signal according to the differential distance therefore. Thus, the clock signal will be regulated difficulty, and further causes the system suspense. Consequently, the stability within the system operation is determined by how to adjust the offset of the clock signal between different operation frequencies of elements.

The offset of the clock signal is regulated manually in the prior art, that is, the user must adjust the resistors and the capacitors placed at the external of the clock generator in accordance with the motherboard layout. For example, for the purpose of clock synchronization between each of chips or elements in a motherboard, smaller resistors and capacitors of the element are implemented if the distance between elements is long, and on the other hand, larger resistors and capacitors of the element are implemented if the distance between elements is short. However, it is hard to realize how the offset of the clock signal is with the traditional method, and it is not accurate enough to control the offset range of the clock signal between each of chips or elements with just the initialization to the clock signal. Meanwhile, the motherboard design is more complex and it is inconvenient for an end user to use the motherboard.

SUMMARY OF THE INVENTION

The invention provides a clock signal detector to control the offset range of the clock signal. The clock signal detector includes a first flip-flop, which has an input end, coupling to a first clock generator, a second flip-flop, which has an input end, coupling to a first signal delayer and the first clock generator through the first signal delayer, a third flip-flop, which has an input end, coupling to a second signal delayer and the first clock generator through the second signal delayer, a fourth flip-flop, which has an input end, coupling to a third delayer and a second clock generator through the third signal delayer, and a fifth flip-flop, which has a clock input end, coupling to a fourth signal delayer and the second clock generator through the fourth signal delayer, wherein the clock input ends of the first flip-flop, the second flip-flop and the third flip-flop are respectively coupled to the second clock generator, the input ends of the fourth flip-flop, and the fifth flip-flop are respectively coupled to the first clock generator and a detecting signal comes from the output ends of each of the flip-flops.

Furthermore, the invention also provides another clock signal detector to control the offset range of the clock signal. The clock signal detector includes a plurality of flip-flops, each having an input end, coupling to a second clock generator respectively, and a plurality of signal delayers, each having an output end, coupling to the input end of the corresponding flip-flop respectively, wherein input ends of each of the signal delayers couples to a first clock generator.

BRIEF DESCRIPITION OF THE DRAWINGS

DETAILED DESCRIPTION OF THE INVENTION

The following description is of the best-contemplated mode of carrying out the invention. This description is made for the purpose of illustrating the general principles of the invention and should not be taken in a limit sense. The scope of the invention is best determined by reference to the appended claims.

Figure 1:
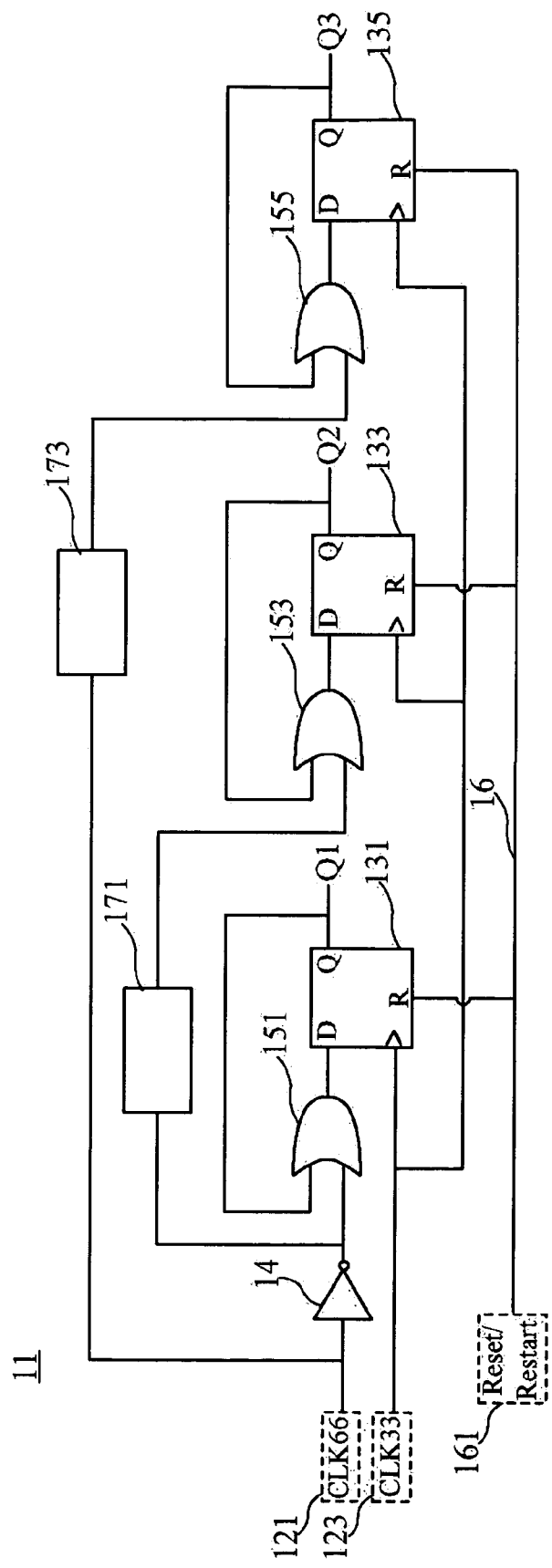
FIG. 1 is a block diagram for circuit connecting according to a preferred embodiment of the present invention.

Referring to FIG. 1, a block diagram for circuit connecting according to a preferred embodiment of the present invention is shown. As shown in FIG. 1, a clock signal detector 11 comprises a first signal delayer 171, a second signal delayer 173, a first flip-flop 131, a second flip-flop 133 and a third flip-flop 135.

The first flip-flop 131 comprises an input end coupled to a first generator 121, a clock input end coupled to a second clock generator 123, and an output end outputting a signal Q1. The second flip-flop 133 comprises an input end coupled to a first signal delayer 171, which is also coupled to the first clock generator 121, a clock input end coupled to the second clock generator 123, and an output end outputting a signal Q2. The third flip-flop 135 comprises an input end coupled to a second signal delayer 173, which is also coupled to the first clock generator 121, a clock input end coupled to the second clock generator 123, and an output end outputting a signal Q3. Also, the first clock generator 121 and the second clock generator 123 can respectively generate a first clock signal CLK66 and a second clock signal CLK33.

As shown in FIG. 1, the offset range of the clock signal detected by the clock signal detector 11, varies with the selection of the first signal delayer 171 and the second signal delayer 173. For example, an inverter 14 is supposed to be placed between the output ends of the first flip-flop 131 and the second flip-flop 133, and the delay time T1 of the first signal delayer 171 is supposed to be 1 ns and the delayer time T2 of the second signal delayer 173 is supposed to be 2.5 ns. The signals Q1, Q2 and Q3, which are served as detecting signals, are generated under the following situations:

a. while values of the signals Q1, Q2, Q3 are supposed to be 0, 1 and 0 respectively, the second clock signal CLK33 falls behind the first clock signal CLK66 within 1 ns;
b. while values of the signals Q1, Q2, Q3 are supposed to be 0, 0 and 0 respectively, the second clock signal CLK33 falls behind the first clock signal CLK66 within 2.5 ns; and
c. while values of the signals Q1, Q2, Q3 are supposed to be 0, 0 and 1 respectively, the second clock signal CLK33 falls behind the first clock signal CLK66 with more than 2.5 ns.

Therefore, according to the signals Q1, Q2 and Q3, it is to be detected whether the first clock signal CLK66 falls behind the second clock CLK33. Moreover, the output ends of each of flip-flops are coupled to an OR gate, and then the output end of the OR gate receives feedback of the signals Q1, Q2 and Q3 respectively.

For example, the output ends of the first flip-flop 131, the second flip-flop 133 and the third flip-flop 135 are respectively coupled to a first OR gate 151, a second OR gate 153 and a third OR gate 155. The signals Q1, Q2 and Q3 are respectively sent to the input ends of the first OR gate 151, the second OR gate 153 and the third OR gate 155, and thereby are latched in order to be easily observed.

The first flip-flop 131, the second flip-flop 133 and the third flip-flop 135 are respectively coupled to a reset signal line 16 inputting a reset signal 161 to each of flip-flops. The input and output signals of each of flip-flops are reset according to the reset signal 161 in order to easily process the detecting operation of the clock signal detector 11.

Figure 2:
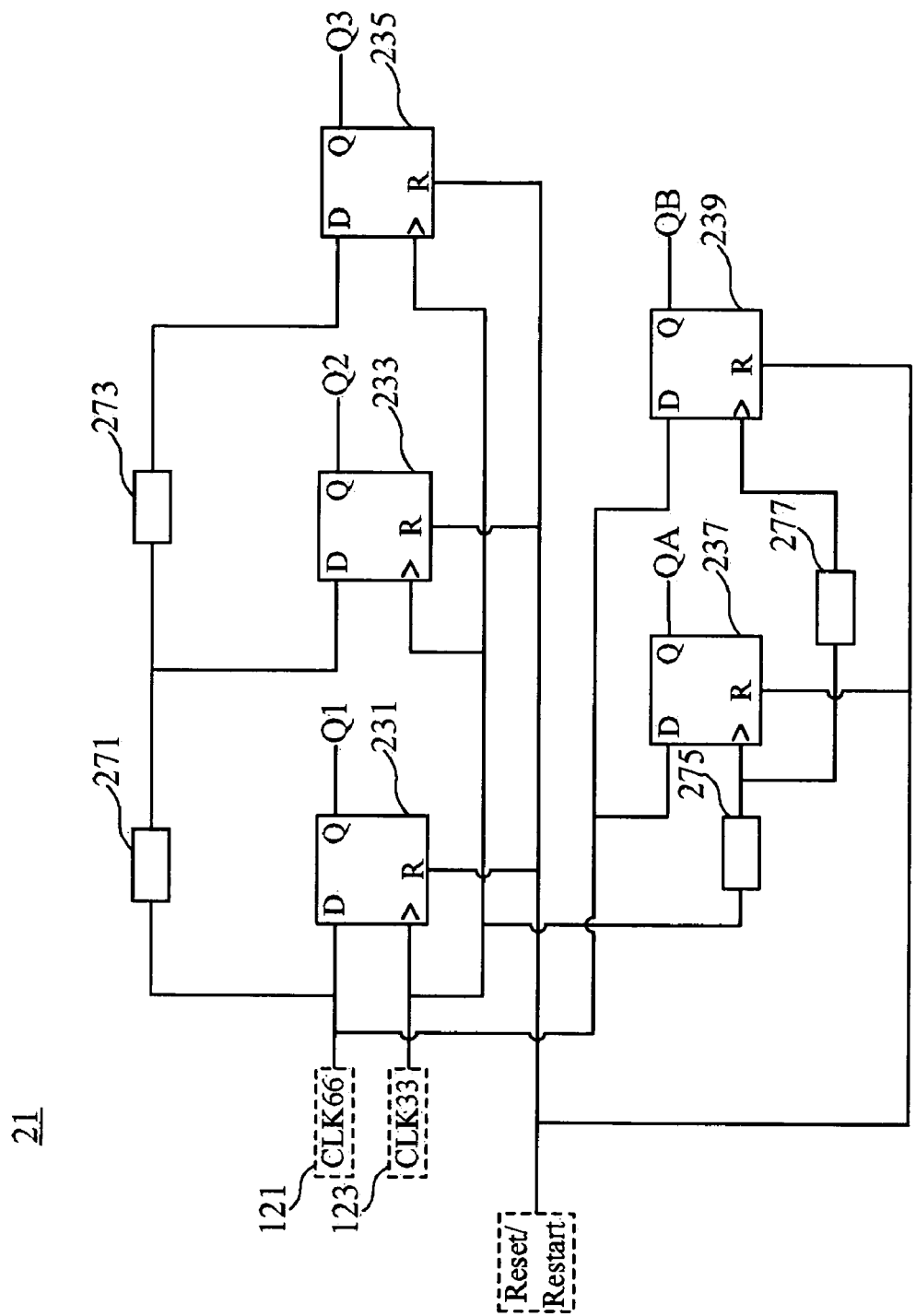
FIG. 2 is a block diagram for circuit connecting according to another preferred embodiment of the present invention.

Referring to FIG. 2, a block diagram for circuit connecting according to another preferred embodiment of the present invention is shown. As shown in FIG. 2, a clock signal detector 21 comprises a first flip-flop 231, a second flip-flop 233, a third flip-flop 235, a fourth flip-flop 237 and a fifth flip-flop 239.

The first flip-flop 231 comprises an input end coupled to a first generator 121, a clock input end coupled to a second clock generator 123, and an output end outputting a signal Q1. The second flip-flop 233 comprises an input end coupled to a first signal delayer 271, which is also coupled to the first clock generator 121, a clock input end coupled to the second clock generator 123, and an output end outputting a signal Q2. The third flip-flop 235 comprises an input end coupled to a second signal delayer 273, which is coupled to the first clock generator 121 by serial connection to the first signal delayer 271, a clock input end coupled to the second clock generator 123, and an output end outputting a signal Q3. In other word, before the second flip-flop 233 and the third flip-flop 235 sequentially receive the first clock signal CLK66, the first signal delayer 271 and the second signal delayer 273 successively delay the first clock signal CLK66 that is outputted form the first clock generator 121.

The fourth flip-flop 237 comprises an input endcoupled to the first clock generator 121, a clock input end coupled to a third signal delayer 275, which is coupled to the second clock generator 123, and comprises an output end outputting a signal QA. The fifth flip-flop 239 comprises an input end coupled to the first clock generator 121, a clock input end, which is coupled to the second clock generator 123 by serial connection to the fourth signal delayer 277 and the third signal delayer 275 in order, and an output end outputting a signal QB. In other word, before the fourth flip-flop 237 and the fifth flip-flop 239 sequentially receive the second clock signal CLK33, the third signal delayer 275 and the fourth signal delayer 277 successively delay the second clock signal CLK33 that is outputted form the second clock generator 123.

As shown in FIG. 2, the offset range between the first clock signal CLK66 and the second clock CLK33 is decided by means of the placement of each of the flip-flops and the signal delayers. The offset range of the clock signal is differential generated according to the selection of each of the signal delayers.

For example, the signal delay times of the first signal delayer 271, the second signal delayer 273, the third signal delayer 275 and the fourth signal delayer 277 are supposed to be 500 ps. The signals Q2, Q3, QA and QB, which are served as detecting signals, are generated under the following situations:

a. while values of the signals Q2, Q3, QA and QB are all supposed to be 1, the first clock signal CLK66 gets ahead the second clock signal CLK33 with more than 1000 ps;
b. while values of the signals Q2, Q3, QA and QB are supposed to be 1, 0, 1 and 1 respectively, the first clock signal CLK66 gets ahead the second clock signal CLK33 with 500 ps to 1000 ps;
c. while values of the signals Q2, Q3, QA and QB are supposed to be 0, 0, 1 and 1 respectively, maybe the first clock signal CLK66 gets ahead or falls behind the second clock signal CLK33 with less than 500 ps;
d. while values of the signals Q2, Q3, QA and QB are supposed to be 0, 0, 0 and 1 respectively, the first clock signal CLK66 falls behind the second clock signal CLK33 with 500 ps to 1000 ps; and
e. while values of the signals Q2, Q3, QA and QB are all supposed to be 0, the first clock signal CLK66 falls behind the second clock signal CLK33 with more than 1000 ps.

Therefore, according to the signals Q2, Q3, QA and QB, it is to be detected whether the first clock signal CLK66 falls behind the second clock CLK33.

Moreover, the signal delay times of the first signal delayer 211, the second signal delayer 213, the third signal delayer 215 and the fourth signal delayer 217 can be set up individually in order to regulate the differentiable offset range of the clock signal of the first clock signal CLK66 and the first clock signal CLK33. Accordingly, the result is easy to recognize on the basis of the offset range of the clock signal of the differential chips or the elements requirement. And, if the second signal delayer 273 and the fourth signal delayer 277 are directly coupled to the first clock generator 121 and the second clock generator 123 respectively, only the delay times T2 and T4 of the second signal delayer 273 and the fourth signal delayer 277 are needed to be adjusted.

Figure 3:
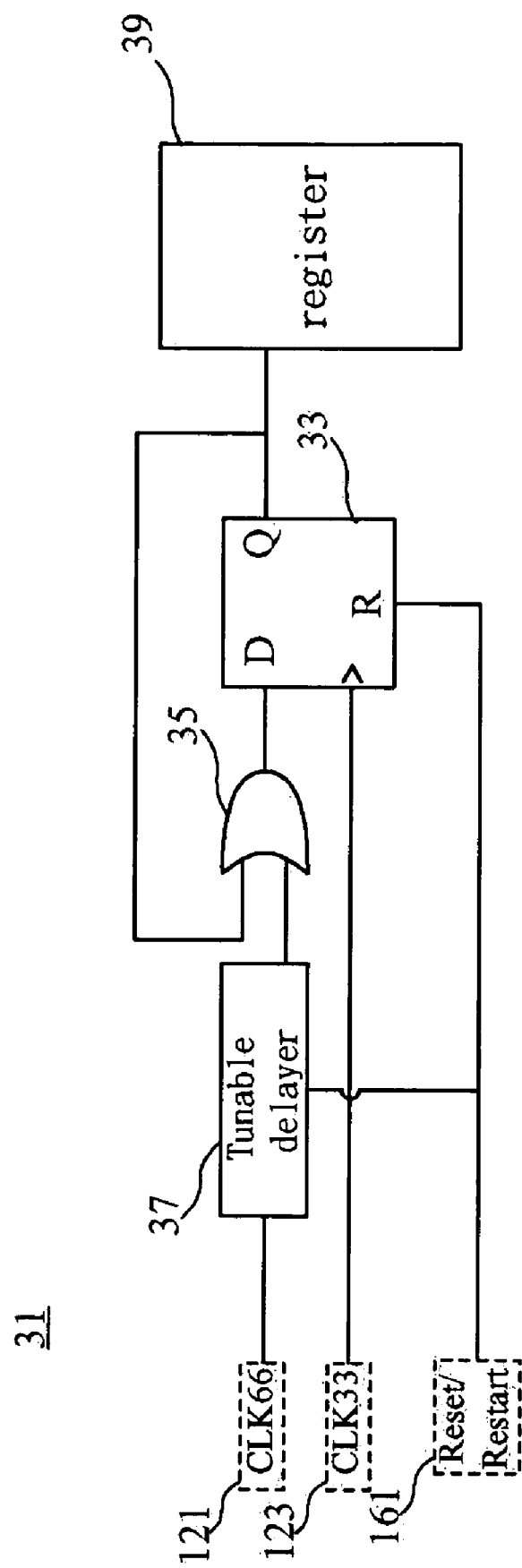
FIG. 3 is a block diagram for circuit connecting according to a further embodiment of the present invention.

Referring to FIG. 3, a block diagram for circuit connecting according to a further embodiment of the present invention is shown. As shown in FIG. 3, a clock signal detector 31 comprises a tunable delayer 37 and a flip-flop 33. The flip-flop 33 includes an input end coupled to the tunable signal delayer 37, which is coupled to a first clock generator 121, a clock input end coupled to the second clock generator 123. Meanwhile, the first clock signal CLK66, which is outputted from the first clock generator 121, is inputted to the input terminal of the flip-flop 33 through the tunable signal delayer 37 with a delay, and the second clock signal CLK33 will be directly inputted to the input end of the flip-flop 33. At the same time, a corresponding detecting signal Q is generated from the output end of the flip-flop 33 according to the change of the first clock signal CLK66 and the second clock signal CLK33. Besides, the flip-flop 33 and the tunable signal delayer 37 are further coupled to a reset signal 161 that are used for a plurality of investigations to get a sequence of detecting signal Q.

The tunable signal delayer 37 changes the delay time T of the detecting signal according to the numbers of the resetting times of the reset signal 161. For example, the delayer time T1 of the tunable signal delayer 37 is supposed to be 0 ns while the first detecting time, and the output end of the flip-flop 33 will output a corresponding detecting signal Q1. The delayer time T2 of the tunable signal delayer 37 is supposed to be 1 ns while the second detecting time (reset once), and the output end of the flip-flop 33 will output a corresponding detecting signal Q2. The delayer time T3 of the tunable signal delayer 37 is supposed to be 2.5 ns while the third detecting time (reset twice), the output end of the flip-flop 33 will output a corresponding detecting signal Q3. The output end of the flip-flop 33 will output the detecting signal Q1, Q2 and Q3 under the following situations:

a. while values of the signals Q1, Q2, Q3 are supposed to be 1, 0 and 0 respectively, the second clock signal CLK33 falls behind the first clock signal CLK66 within 1 ns;
b. while values of the signals Q1, Q2, Q3 are supposed to be 1, 1 and 0 respectively, the second clock signal CLK33 falls behind the first clock signal CLK66 within 2.5 ns; and
c. while values of the signals Q1, Q2, Q3 are supposed to be 1, 1 and 1 respectively, the second clock signal CLK33 falls behind the first clock signal CLK66 with more than 2.5 ns.

The output end of the flip-flop 33 is further coupled a register 39, which can record the detecting signal Q1, Q2 and Q3 that are outputted from the flip-flop 33 within the register 39, and the offset range of the clock signal is decided according to the values of the detecting signal Q1, Q2 and Q3. Of course, the register 39 for storing each detecting signal can be implemented in each embodiment of the present invention. Thus, the phase for each clock generator is directly regulated according to the detecting signal, which is stored in a register and accessed by a system management bus after identification.

Figure 4:
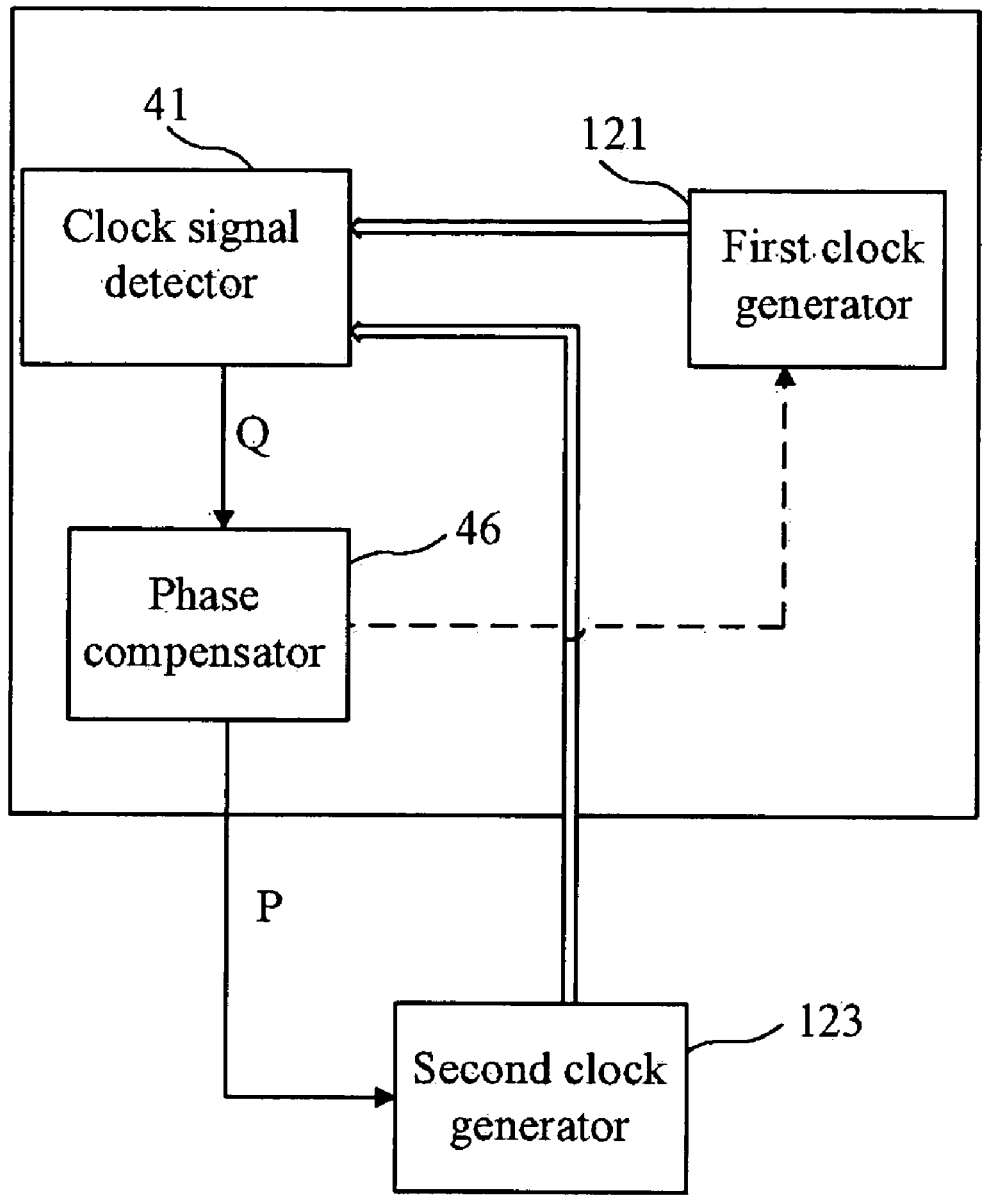
FIG. 4 is a block diagram for circuit connecting according to another further embodiment of the present invention.

Finally, referring to FIG. 4, a block diagram for circuit connecting according to another further embodiment of the present invention is shown. The clock signal detector of the present invention can directly regulate the phase of each clock generator to cooperate with a phase compensator. As shown in FIG. 4, a regulating clock signal device 40 comprises a clock signal detector 41, which includes an input end coupled to a first clock generator 121, a clock input end coupled to a second clock generator 123, and an output end coupled to a phase compensator 46, and the phase compensator 46, which comprises an output end coupled to the first clock generator 121 or the second clock generator 123.

In the moment, the clock signal detector 41 generates a detecting signal Q according to the first signal and the second signal that are respectively generated from the first clock generator 121 and the second clock generator 123. The phase compensator 46 issues a regulating clock signal P to the first clock generator 121 or the second clock generator 123, which are coupled to the phase compensator 46, according to the detecting signal Q after the detecting signal Q are inputted into the phase compensator 46. While the first clock generator 121 or the second clock generator 123 receives the regulating clock signal P, the first clock signal or the second clock signal are adjusted to keep within the offset range between the first clock signal and the second clock signal.

The clock signal detector 41 can be implemented with any clock signal detector that are described as the mentioned above according to each embodiment of the present invention. The phase compensator 46 is designed on the basis of the detecting signal Q that is outputted from the output end of the clock signal detector 41, so it is easy to regulate the clock signal. For example, if the clock signal detector 21 in FIG. 2 is supposed to detect the clock signal, the clock signal detector 21 is coupled to the phase compensator 46 through the output ends of the second flip-flop 233, the third flip-flop 235, the fourth flip-flop 237 and the fifth flip-flop 239. If the delay times of the first signal delayer 271, the second signal delayer 273, the third signal delayer 275 and the fourth signal delayer 277 are supposed to be 500 ps, the detecting signal Q2, Q3, QA and QB will be set up under the following situations. The phase compensator 46 will issue a corresponding regulating clock signal P according to the detecting signals Q2, Q3, QA and QB:

a. while values of the signals Q2, Q3, QA and QB are 1, the first clock signal CLK66 gets ahead the second clock signal CLK33 with more than 1000 ps. Meanwhile, the phase compensator 46 receives the detecting signals (Q2=1, Q3=1, QA=1, QB=1) and sends out a regulating clock signal P1 to the second clock generator 123. After receiving the regulating clock signal P1, the phase of the second clock signal CLK33 was shifted forward 1000 ps;
b. while values of the signals Q2, Q3, QA and QB are 1, 0, 1 and 1 respectively, the first clock signal CLK66 gets ahead the second clock signal CLK33 with 500 ps to 1000 ps. Meanwhile, the phase compensator 46 receives the detecting signals(Q2=1, Q3=0, QA=1, QB=1)and sends out a regulating clock signal P2 to the second clock generator 123. After receiving the regulating clock signal P2, the phase of the second clock signal CLK33 was shifted forward 500 ps;
c. while values of the signals Q2, Q3, QA and QB are 0, 0, 1 and 1 respectively, the first clock signal CLK66 gets ahead or falls behind the second clock signal CLK33 with less than 500 ps. Meanwhile, the phase compensator 46 will not send out any regulating clock signal to the second clock generator 123, and the offset range between the first clock signal and the second clock signal will keep within 500 ps;
d. while values of the signals Q2, Q3, QA and QB are 0, 0, 0 and 1 respectively, the first clock signal CLK66 falls behind the second clock signal CLK33 with 500 ps to 1000 ps. Meanwhile, the phase compensator 46 receives the detecting signals Q2=0, Q3=0, QA=0, QB=1)and sends out a regulating clock signal P3 to the second clock generator 123. After receiving the regulating clock signal P3, the phase of the second clock signal CLK33 was shifted backward 500 ps; and
e. while values of the signals Q2, Q3, QA and QB are 0, the first clock signal CLK66 falls behind the second clock signal CLK33 with more than 1000 ps. Meanwhile, the phase compensator 46 receives the detecting signals (Q2=0, Q3=0, QA=0, QB=0) and sends out a regulating clock signal P4 to the second clock generator 123. After receiving the regulating clock signal P4, the phase of the second clock signal CLK33 was shifted backward 1000 ps;

Accordingly, the offset range of the clock signal of the first clock signal and the second clock signal will be controlled within 500 ps through setting the phase compensator 46 and using the clock signal detector. Of course, in each embodiment, the offset range of the clock signal of the first clock signal and the second clock signal can be adjusted according to the system requirement. The phase compensator 46 is consisted with a logic circuit, which outputs a regulating clock signal P that is changed according to variation of the detecting signal Q. In the present invention, the clock signal detector 41 and the phase compensator 46 are integrated into a chip, or respectively placed on a motherboard so the clock signal between each of elements and chips can be easily detected and adjusted in the same way.

In summary, it is appreciated that the present invention relates to a clock signal detector, and more particularly to a detector for detecting the offset of the clock signal, therefore, the offset ranges of offset ranges of the clock signals from two different groups will be within the range of the system requirement, such that can benefit for the system operation.

The foregoing description is merely one embodiment of present invention and not considered as restrictive. All equivalent variations and modifications in process, method, feature, and spirit in accordance with the appended claims may be made without in any way from the scope of the invention.

What is claimed is:

1. A clock signal detector, comprising:
   a first flip-flop, comprising an input end, and coupled to a first clock generator;
   a second flip-flop, comprising an input end, coupled to a first signal delayer, and further coupled to said first clock generator through said first signal delayer;
   a third flip-flop, comprising an input end, coupled to a second signal delayer, and further coupled to said first clock generator through said second signal delayer;
   a fourth flip-flop, comprising a clock input end, coupled to a third delayer, and further coupled to a second clock generator through said third signal delayer; and
   a fifth flip-flop, comprising a clock input end, coupled to a fourth signal delayer, and further coupled to said second clock generator through said fourth signal delayer;
   wherein, said clock input ends of said first flip-flop, said second flip-flop and said third flip-flop are respectively coupled to said second clock generator, said input ends of said fourth flip-flop and fifth flip-flop are respectively coupled to said first clock generator, and a detecting signal outputted from the output ends of each of said flip-flops.

2. The clock signal detector of claim 1, wherein said output ends of said flip-flops are further connected to a register.

3. The clock signal detector of claim 1, wherein said second signal delayer is serially coupled to said first signal delayer.

4. The clock signal detector of claim 1, wherein said fourth signal delayer is serially coupled to said third signal delayer.

5. The clock signal detector of claim 1, wherein said output end of each of said flip-flops is coupled to a phase compensator, and an output end of said phase compensator is coupled to one of said first clock generator and said second clock generator.

6. The clock signal detector of claim 5, wherein said clock signal detection device and phase compensator are integrated into one of a chip and a motherboard.

7. The clock signal detector of claim 1, wherein each of said first flip-flop, said second flip-flop said third flip-flop, said fourth flip-flop and said fifth flip-flop is respectively coupled to a reset signal line.

8. A clock signal detector, comprising:
   a plurality of flip-flops, each of said flip-flops comprising a clock input end, respectively coupled to a second clock generator;
   a plurality of signal delayers, each of said signal delayers comprising an output end, respectively coupled to an input end of a corresponding one of said flip-flops, each of said signal delayers comprising an input end respectively coupled to a first clock generator; and
   a plurality of OR gates, each of said signal delayers being coupled to said corresponding flip-flop through one input of a respective one of said OR gates, and an output signal that is output from an output end of each said flip-flops being coupled in feedback relationship to another input of a corresponding one of said OR gates.

9. The clock signal detector of claim 8, wherein each of said signal delayers is a tunable signal delayer.

10. The clock signal detector of claim 9, wherein each of said flip-flops is coupled to a reset signal line.

11. The clock signal detector of claim 9, wherein each of output ends of said flip-flops are coupled to a register.

12. The clock signal detector of claim 9, wherein each of said flip-flops comprises an output end respectively coupled to a phase compensator, said phase compensator comprises an output end coupled to one of said first clock generator or said second clock generator.

13. The clock signal detector of claim 12, wherein said clock signal detector and said phase compensator are integrated in a chip or a motherboard 14. A clock signal detector comprising:
   a plurality of flip-flops, each of said flip-flop comprising a clock input end respectively couple to a second clock generator; and
   a plurality of signal delayers, each of said signal delayers comprising an output end respectively coupled to an input end of a corresponding one of said flip-flops, generator,
   wherein said flip-flops and said signal delayers being selectable into three group, a first flip-flop and a first signal delayer to form a first module, a second flip-flop and a second signal delayer to form a second module, and a third flip-flop and third signal delayer to form a third module, wherein said first signal delayer is without phase delay, each of said flip-flops having output ends coupled to a register.

15. The clock signal detector of claim 14, further comprising a plurality of OR gates, said first clock generator being coupled to one input of each of said OR gates and an output of each of said OR gates being coupled to a respective one of said flip-fops, and an output signal that is outputted from an output end of each of said flip-flops being coupled in feedback relationship to another input of a corresponding one of said OR gates.

16. The clock signal detector of claim 15, further comprising an inverter coupled between said one input of a respective one of said OR gates coupled to a corresponding one of said flip-flops and said first clock generator.

17. The clock signal detector of claim 14, wherein an output ends of each of said flip-flops are coupled to a phase compensator, and an output end of said phase compensator is coupled to one of said first clock generator, said second clock generator and the combination thereof 18. The clock signal detector of claim 17, wherein said clock signal detector and said phase compensator are integrated into a chip or a motherboard.

* * * * *